June 7, 1966
E. A. BROWN ET AL
3,254,381
METHOD OF MANUFACTURING COMPOSITE METALLIC ROLLS
Filed Aug. 20, 1963
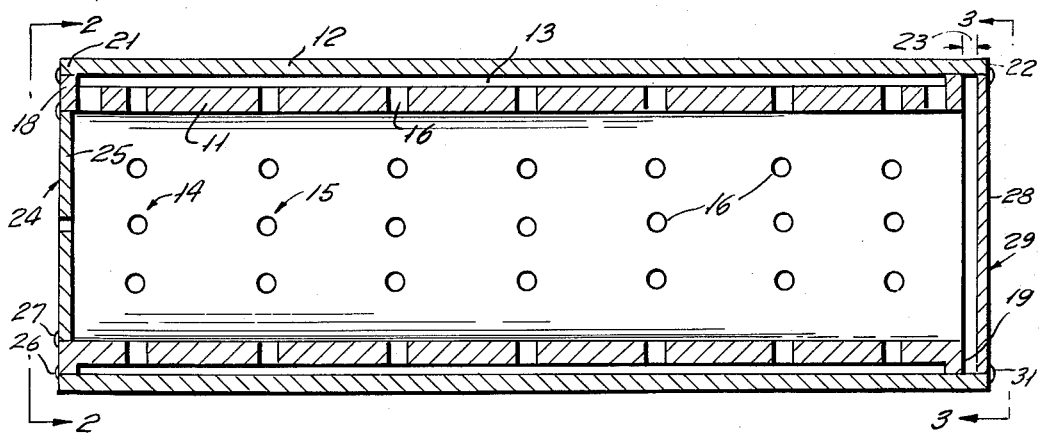
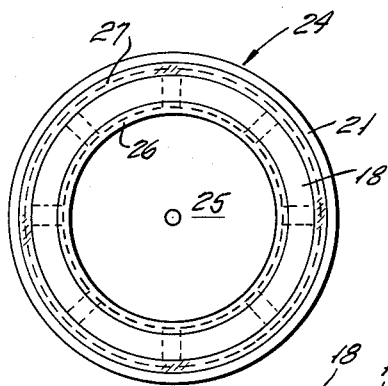
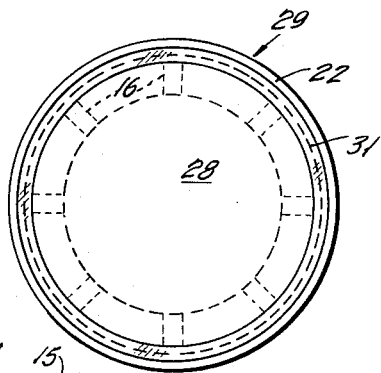
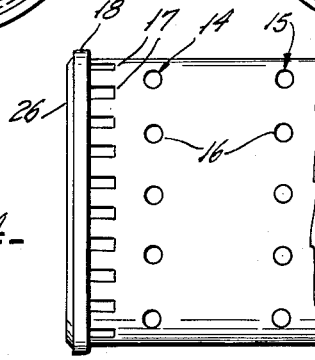
INVENTORS
EDWIN A. BROWN
GEORGE H. FOSTER
THEODORE SCHAFER
BY
OSTROLENK, FABER, GERB & SOFFEN
ATTORNEYS

United States Patent Office 3,254,381
Patented June 7, 1966

3,254,381
METHOD OF MANUFACTURING COMPOSITE METALLIC ROLLS
Edwin A. Brown, San Gabriel, George H. Foster, Whittier, and Theodore Schafer, Glendale, Calif., assignors to International Rectifier Corporation, El Segundo, Calif., a corporation of California
Filed Aug. 20, 1963, Ser. No. 303,313
6 Claims. (Cl. 22—200.5)

This invention relates to a method of manufacturing composite metallic rolls having wear-resistant external surfaces, and more particularly is directed to such a method for producing smooth, crack-free wear-resistant alloy layers on steel or similar metallic core rolls.

As described in Patent No. 2,275,503, it is known to produce wear-resistant metallic facings on metallic rolls or like articles by centrifugally casting an alloy melt through apertures in the article into an annular region between the article and an external forming tube. It has been found that the metallic facings thus produced may have cracks formed therein due to the differential thermal expansion of the component materials of the annular forming elements. In some cases, depending upon the extent the coefficients of thermal expansion of the core roll and the forming tube differ, the crack formation may substantially limit the application of the composite rolls produced.

It is among the objects of the present invention to provide an improvement in the aforesaid method of manufacturing composite metallic rolls, which facilitates the production of smooth wear-resistant external surfaces, without concomitant crack formation therein.

An additional object of the invention is to provide such a method which may be practiced employing inner core rolls and outer forming tubes constituted of materials having markedly different coefficients of thermal expansion.

In accordance with the invention an apertured, hollow core roll is placed within a metallic forming tube defining an annular region therebetween, with one flanged end of the roll and the corresponding end of the tube positioned in abutting, substantialy co-planar relation, and the opposite end of the tube being displaced outwardly of the corresponding end of the roll by a distance at least equal to the degree of thermal expansion of the roll when the resulting composite assembly is thereafter heated. A metallic composition for forming the wear-resistant external layer on the walls of the core roll is then inserted within the hollow roll, as by placing metallic slugs of the proper metal or metals therein. A pair of end plates is thereafter mounted at the opposite ends of the forming roll, the first being mounted in abutting relation with the one flanged end of the core roll, and the second being mounted in abutting relation with the opposite end of the forming tube.

The opposite ends of the resulting composite assembly are then sealed, the first by welding the first end of the core roll to the abutting first end walls of the forming tube and to the abutting walls of the first end plate, and the second by welding the second end plate to the abutting opposite end walls of the forming tube. The single weld at the second end of the assembly leaves sufficient clearance between the second end plate and the adjacent flanged end of the core roll to permit thermal expansion of the walls of the roll upon heating, without danger of concomitant crack formation.

The composite sealed assembly thus provided is thereafter heated, in accordance with the procedure disclosed in the aforesaid patent, at a temperature sufficient to melt the metallic composition, is rotated to centrifugally distribute the molten composition in the annulus between the core roll and the forming tube and cooled to solidify the wear-resistant, crack-free metallic layer on the outer walls of the roll. The forming tube is subsequently removed, as by machining or grinding, to produce the desired metallic roll having an outer wear-resistant and crack-free metallic surface layer thereon.

The metallic layer formed on the external surfaces of the core roll is desirably composed of a metallic alloy suitably constituted to provide desired abrasion resistance, corrosion resistance and/or other specific properties, which alloy has a melting point greater than 1,000° F. and less than the melting points of the constituent materials of the core roll and forming tube. Pre-formed slugs of such alloy may be inserted within the core roll in the procedure outlined above, or, alternatively, suitably proportioned pieces of the individual metals which, when melted together, will produce the desired alloy composition, may be so utilized.

One desirable hard, wear-resistant alloy which may be utilized to form the metallic lining is a ferrous alloy consisting principally of iron and containing from about 2.5% to 6% by weight of nickel, from about 2% to 4% by weight of combined carbon, from about 0.2% to 2.5% by weight of boron, up to about 2.5% by weight of silicon, up to about 0.1% by weight of sulfur and up to about 0.3% by weight of phosphorus. The composition of such a hard, substantially unmachinable ferrous alloy is more fully described in U.S. Patent No. 2,046,913.

An additional alloy which may be employed to form the metallic lining in accordance with the invention is a nickel-cobalt alloy containing from about 40% to 45% by weight of nickel, from about 40% to 45% by weight of cobalt, from about 6% to 8% by weight of chromium, from about 3% to 4% by weight of boron, from about 1% to 2% by weight of silicon, up to about 1% by weight of manganese and up to about 0.5% by weight of combined carbon. This alloy, while having poorer hardness characteristics than the ferrous alloy referred to above, possesses superior corrosion resistance and is readily machinable employing standard low-carbide tools.

The nature and objects of the present invention will be more fully apparent from a consideration of the following detailed description of one embodiment of the invention employing the apparatus shown in the accompanying drawing, in which:

FIGURE 1 is a longitudinal section through a composite assembly in which the external wear-resistant metallic layer may be formed;

FIGURE 2 is an end view, viewed in the direction of line 2—2 in FIGURE 1;

FIGURE 3 is an end view, similar to FIGURE 2, viewed in the direction of the line 3—3 in FIGURE 1; and FIGURE 4 is a partial plan view of the core roll of the composite assembly, showing one end thereof.

Turning to the drawing, a steel or similar metal roll 11, which is to be lined on its outer periphery with the desired wear-resistant layer, is illustrated positioned within a metallic forming tube 12, the diameter of which is sufficiently larger than the diameter of roll 11 to define an annular region 13 therebetween. A number of transverse rows 14, 15, etc. of radially disposed apertures 16 extend through the walls of the core roll 11, connected with the annular region 13 between such roll and the forming tube 12.

Two rows of longitudinal slag-removal apertures, illustrated as slits 17, are positioned around the circumference of the core roll 11, adjacent continuous annular flanges 18 and 19 formed at the opposite ends of the roll. It will be understood that the slag-removal apertures may be provided in any desired shape, e.g., as closely spaced cylindrical holes extending through the walls of the core roll 11.

The core roll 11 is so positioned within the forming tube 12 that the annular flange 18 at the first end of the roll and the corresponding first end 21 of the forming tube are positioned in abutting, substantially co-planar relation. The relative lengths of roll 11 and tube 12 are such that the second or opposite end 22 of the forming tube is displaced outwardly of the corresponding flanged end 19 of the core roll by a distance 23 equal to or greater than the degree of thermal expansion of the roll, when heated, as described hereinafter.

The metallic composition (not shown) utilized to form the metallic lining is thereafter inserted within the core roll and the ends of the resulting composite assembly sealed as described hereinafter.

As shown in FIGURE 1, the first end 24 of the composite assembly is sealed by mounting a first end plate 25 in abutting relation with the flanged end 18 of the core roll 11 which, as noted above, abuts the end 21 of the forming tube 12. The flanged end 18 is thereafter welded to both the walls of the forming tube, as indicated at 26, and the end plate 25, as indicated at 27, to define the complete seal at such end.

A second end plate 28 is mounted at the opposite end 29 of the composite assembly in abutting relation with the opposite end 22 of the forming tube. The end plate 28 is then welded, as indicated at 31, to the forming tube 12, leaving the opposite flanged end 19 of the core roll 11 free for thermal expansion upon heating of the composite assembly.

The entire assembly is thereafter placed in a furnace and heated to a temperature sufficient to melt the metallic composition utilized to form the wear-resistant lining. After heating the assembly at a temperature of from about 2100° F. to 2300° F., preferably from 2170° F. to 2270° F., desirably for a period of from about 45 to 90 minutes, it is removed from the furnace. The assembly is rotated in the furnace at a speed of from 5 to 10 r.p.m. during the melting operation.

The assembly is then rotated about its major axis at a relatively high rate of speed, desirably from about 600 to 1500 r.p.m., depending on the diameter of the composite assembly, to force the molten metal through the walls of roll 11 through apertures 10 and into the annular region 13 between the core roll and the forming tube 12.

During rotation any slag trapped at the edges of the core roll is removed through slits 17 into the hollow interior of the roll, due to its relatively low density as compared with the alloy layer to be cast. The slag may thereafter be honed out of the core roll, if desired.

Rotation and simultaneous cooling of the assembly is continued until the wear-resistant alloy layer solidifies, binding roll 11, tube 12, and the lining metal into a solid mass.

The thus integrated assembly is thereafter separated from the rotating device, the end plates 25 and 28 removed, and the forming tube 12 finally removed, as by machining or grinding, leaving the desired integral composite metallic roll whose peripheral surfaces are defined by a crack-free layer of the wear-resistant metallic alloy.

It will be understood that the thickness of the forming tube 12 is sufficient to withstand the thermal and mechanical stresses imposed by the successive heating and rotating operations, but is no thicker than required for such purposes because of the necessity to remove such tube after forming the alloy layer on the walls of the core roll 11. It will be further understood that the thickness of the wear-resistant layer may be conveniently determined, inter alia, by the annular space between the core roll and the forming tube, and that the composition of the core roll and the alloy layer formed thereon may be varied in accordance with the intended use for the integral composite roll. Since these and other changes may be made in the described embodiment without departing from the scope of the present invention, it is intended that all matter contained in the above description shall be interpreted as illustrative and not in a limiting sense.

We claim:
1. In a method of manufacturing composite metallic rolls having wear-resistant external surfaces, involving
  (a) mounting an apertured metallic core roll within a metallic forming tube having a diameter greater than that of said roll and defining an annular region therebetween;
  (b) inserting a metallic composition, melting at a temperature in excess of 1000° F. and less than the melting points of said roll and said tube, within the said roll;
  (c) sealing the ends of said roll and of said annular region;
  (d) heating the resulting composite assembly at temperatures sufficient to melt said metallic composition;
  (e) rotating the composite assembly to centrifugally distribute the molten composition throughout said annular region; and
  (f) cooling the composite assembly during rotation thereof to thereby solidify the molten metal and form a wear-resistant metallic coating on said roll;
the improvement comprising
  (A) mounting the apertured core roll within the forming tube with a first end of the roll in substantially co-planar abutting relation with a first end of the tube, and the opposite end of the roll displaced inwardly of the opposite end of the tube by a distance at least equal to the degree of thermal expansion of said roll during said heating step;
  (B) mounting end plates at the opposite ends of the composite assembly, the first end plate being mounted in abutting relation with said first end of the roll, and the second end plate being mounted in abutting relation with said opposite end of the tube;
  (C) welding said first end of said roll to the abutting first end walls of said tube and to the abutting walls of said first end plate to seal the first end of the composite assembly; and
  (D) welding said second end plate to the abutting opposite end walls of said tube to seal the opposite end of the composite assembly and thereby provide an expansion joint permitting thermal expansion of said roll within said tube during said heating step.

2. A method of manufacturing composite metallic rolls having wear-resistant external surfaces, which comprises:
  (a) mounting an elongated, hollow core roll having a plurality of rows of radially disposed apertures extending through its longitudinal walls and bearing continuous annular flanges at its opposite ends within a metallic forming tube having a diameter sufficiently greater than said roll to define an annular region therebetween,
    (1) one flanged end of the roll and the corresponding end of the tube positioned in abutting, substantially co-planar relation, and
    (2) the opposite end of the tube being displaced outwardly of the corresponding flanged end of the roll by a distance at least equal to the degree of thermal expansion of the roll when heated as set forth hereinafter;
  (b) placing a solid metallic component having a melting point greater than 1000° F. and less than the melting points of the constituent materials of said roll and said tube, within the said roll;
  (c) mounting an end plate in abutting relation with said one flanged end of the roll and welding said one flanged end to both the abutting end walls of said tube and to said end plate to define a seal at the one end of the composite assembly;
  (d) mounting a second end plate at said opposite end of the tube in abutting relation therewith and welding said second end plate to said opposite end of the tube to define a seal at the opposite end of the composite assembly, while providing sufficient space for thermal expansion of the walls of said roll upon heating;

(e) heating the composite assembly at a temperature sufficient to melt said metallic component;

(f) rotating the composite assembly to centrifugally distribute the resulting melt through the apertures in the walls of said roll into the annular region between said roll and said tube;

(g) cooling the composite assembly during step (f) to solidify said melt on the peripheral walls of said roll and thereby form a wear-resistant metallic layer thereon; and (h) removing said tube to expose the desired composite metallic roll including said wear-resistant metallic layer formed thereon.

3. The method as defined in claim 2, in which slag is removed from said annular region during step (f) by being passed through annular apertures adjacent the ends of said core roll into the hollow interior thereof.

4. The method as defined in claim 2, in which the composite assembly heated in step (e) is heated at a temperature of from 2100° F. to 2300° F. for a period of from 45 to 90 minutes.

5. The method as defined in claim 2, in which the core roll is constituted of steel and in which the metallic layer formed thereon is constituted of a ferrous alloy consisting principally of iron and containing from 2.5% to 6% by weight of nickel, from 2% to 4% by weight of combined carbon, from 0.2% to 2.5% by weight of boron, up to 2.5% by weight of silicon, up to 0.1% by weight of sulfur and up to 0.3% by weight of phosphorus.

6. The method as defined in claim 2, in which the core roll is constituted of steel and in which the metallic layer formed thereon is constituted of a nickel-cobalt alloy of from 40% to 45% by weight of nickel, from 40% to 45% by weight of cobalt, from 6% to 8% by weight of chromium, from 3% to 4% by weight of boron, from 1% to 2% by weight of silicon, up to 1% by weight of manganese and up to 0.5% by weight of combined carbon.

No references cited.

J. SPENCER OVERHOLSER, *Primary Examiner.*